Patented Mar. 6, 1923.

1,447,485

UNITED STATES PATENT OFFICE.

EMIL REBER, OF BASEL, SWITZERLAND, ASSIGNOR TO SOCIETY OF CHEMICAL INDUSTRY IN BASLE, OF BASEL, SWITZERLAND.

COLORING MATTERS DERIVED FROM PYRAZOLONE.

No Drawing. Application filed April 8, 1922. Serial No. 550,837.

*To all whom it may concern:*

Be it known that I, EMIL REBER, a citizen of the Swiss Republic, and resident of Basel, Switzerland, have invented new Coloring Matters Derived from Pyrazolone, of which the following is a full, clear, and exact specification.

I have found that new valuable coloring matters can be obtained in coupling aromatic diazocompounds with 1-(2'-methyl-3'-sulfo-5'-isopropyl)-phenyl-3-methyl-5-pyrazolone prepared by condensation, with acetoacetic ester, of the hydrazine obtained by the usual methods from the 2:6-aminocymolsulfonic acid (see Beilstein II, 3d edition, page 584).

These new coloring matters which correspond to the general formula R'—N=N—R, wherein R' represents the complex of the 1-(2'-methyl-3'-sulfo-5'-isopropyl)-phenyl-3-methyl-5-pyrazolone and R a nucleus of the benzene or naphthalene series capable of carrying substituents, have the form of yellow, more or less orange powders, which are soluble in water and in sulfuric acid in giving yellow solutions. In an acid bath they dye wool golden yellow tints of great uniformity and excellent fastness to light.

*Example.*

I dissolve in 300 parts of water 15 parts of sodium carbonate and 31 parts of 1-(2'-methyl-3'-sulfo-5'-isopropyl)-phenyl-3-methyl-5-pyrazolone, then I cool the mass with ice and add thereto the diazoic compound obtained by means of 9.3 parts of aniline. The coloring matter isolated in the usual manner has in dry state the form of a yellow powder. It dyes wool of tints of the tartrazine yellow, having a great uniformity and a great fastness to light.

Analogous coloring matters can be obtained with the amines of the benzene and naphthalene series.

What I claim is:

1. As new products the hereinbefore described new coloring matters resulting from the combination of aromatic diazocompounds with 1-(2'-methyl-3'-sulfo-5'-isopropyl)-phenyl-3-methyl-5-pyrazolone and corresponding to the general formula R'—N=N—R, wherein R' represents the complex of the 1-(2' methyl-3'-sulfo-5'-isopropyl)-phenyl-3-methyl-5-pyrazolone and R an aromatic nucleus which may carry substituents, the said coloring matters being yellow, more or less orange powders, soluble in water and in sulfuric acid to yellow solutions and dyeing wool golden yellow tints of great uniformity and excellent fastness to light.

2. As new products the hereinbefore described new coloring matters resulting from the combination of diazoic compounds of the benzene series with 1-(2'-methyl-3'-sulfo-5'-isopropyl)-phenyl-3-methyl-5-pyrazolone and corresponding to the general formula R'—N=N—R, wherein R' represents the complex of the 1-(2'-methyl-3'-sulfo-5'-isopropyl)-phenyl-3-methyl-5-pyrazolone and R a nucleus of the benzene series which may carry substituents, the said coloring matters being yellow, more or less orange powders, soluble in water and in sulfuric acid to yellow solutions and dyeing wool golden yellow tints of great uniformity and excellent fastness to light.

3. As a new article of manufacture, the coloring matter resulting from the combination of diazobenzene with 1-(2'-methyl-3'-sulfo-5'-isopropyl)-phenyl-3-methyl-5-pyrazolone and corresponding to the general formula R'—N=N—R, wherein R' represents the complex of the 1-(2'-methyl-3'-sulfo-5'-isopropyl)-phenyl-3-methyl-5-pyrazolone and R the benzene nucleus, the said coloring matter being a yellow powder soluble in water and in sulfuric acid to yellow solutions and dyeing wool tartrazine yellow tints of great uniformity and of great fastness to light.

In witness whereof I have hereunto signed my name this 25th day of March, 1922, in the presence of two subscribing witnesses.

EMIL REBER.

Witnesses:
 FREDERIC KURZ,
 AMAND RAUN.